March 20, 1956  A. G. JACOB  2,738,589
KNEE ACTION ALIGNMENT DEVICE
Filed Aug. 4, 1949  4 Sheets-Sheet 1

INVENTOR
ANDREW G. JACOB
BY
Emery, Varney, Whittemore &Dix
ATTORNEYS

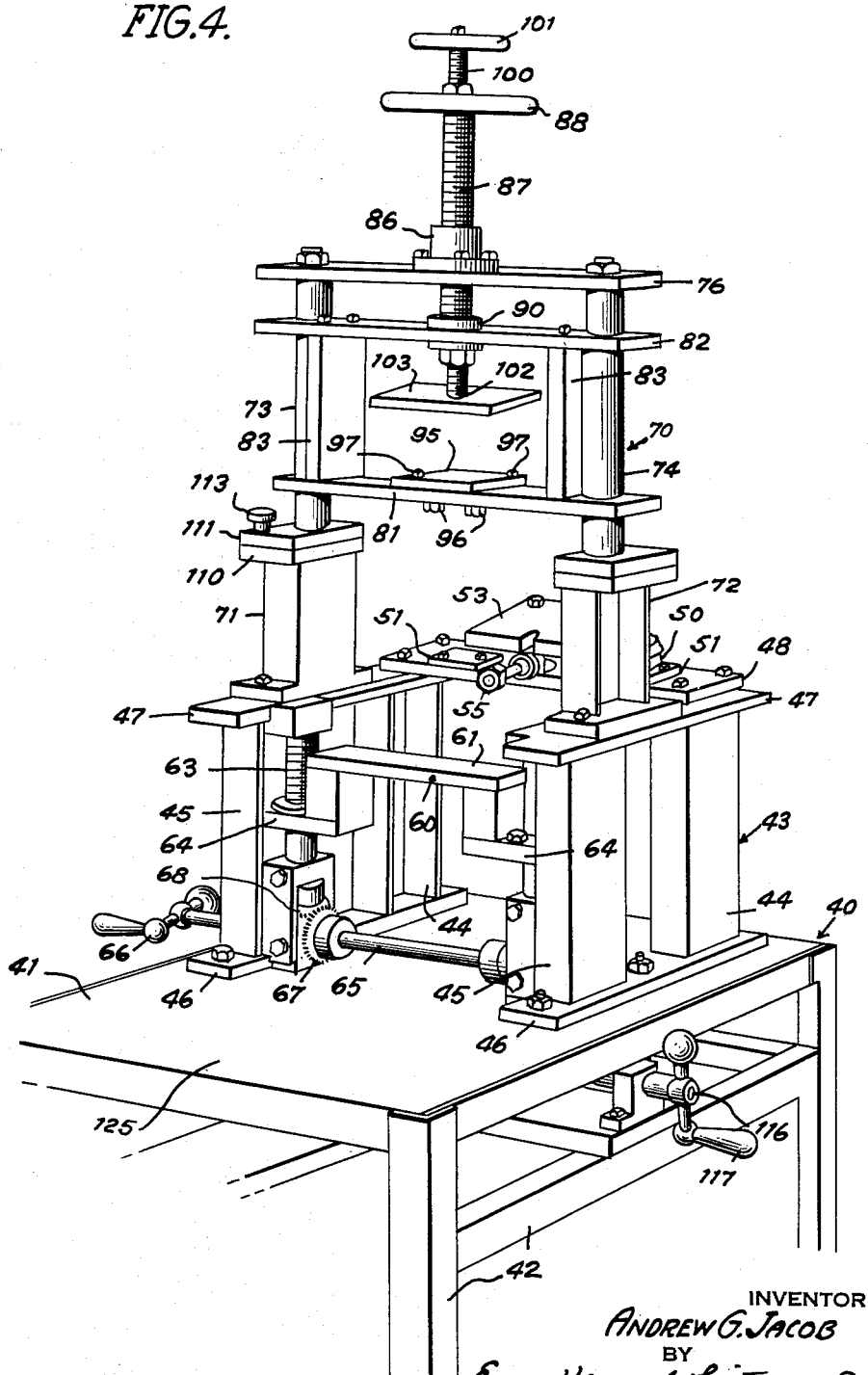

March 20, 1956 A. G. JACOB 2,738,589
KNEE ACTION ALIGNMENT DEVICE
Filed Aug. 4, 1949 4 Sheets-Sheet 3

INVENTOR
ANDREW G. JACOB
BY
Emy. Varney. Whittemore &Dix
ATTORNEYS

United States Patent Office 2,738,589
Patented Mar. 20, 1956

2,738,589
KNEE ACTION ALIGNMENT DEVICE
Andrew G. Jacob, Rockville Centre, N. Y.
Application August 4, 1949, Serial No. 108,492
13 Claims. (Cl. 33—180)

The present invention relates to a method and a device for holding, gauging and locating a front wheel suspension unit for repair, assembly and/or alignment, while detached from the chassis of its motor vehicle.

In designing the steering and wheel supporting elements of a motor vehicle, several factors are taken into account, such as weight, wheel base, location of center of gravity, turning radius, etc. During the manufacture of motor vehicles, the front wheels are adjusted and aligned at the factory for correct angles of camber and caster, in accordance with these design factors. However, this adjustment may be disturbed in use because of road shocks, collisions, wear and the like, so that readjustment is very often required during the life of the car. Each individual manufacturer of motor vehicles has its own specifications for proper alignment, dependent on its design factors. The data for this alignment is usually compiled for the information of garage mechanics to aid them in making repairs or readjustments of misaligned parts. This device is recommended for use before assembling new cars when "knee-action" type front suspension systems are used. The use of this device will permit the new car manufacturer to adjust the alignment angles of camber and caster in the sub-assembly department of the manufacturer. After all of the knee-action elements are assembled to provide the knee-action unit and before being installed on to the chassis of the particular car, each unit is finally adjusted within curb weight specification of the manufacturer, thereby lessening the time consumed in adjusting the alignment angles on a completely assembled car.

This device is also recommended for those companies which are in the business of re-manufacturing or rebuilding assembled knee-action units for replacement purposes in order to determine or adjust the angles of alignment for camber or caster.

This is very desirable in order to assure the proper fit of the unit when mounted in the automobile and so that the angles of camber and caster conform to the specification specified by the car manufacturer.

In front wheel suspension units of the conventional knee-action type, there is usually provided a lower control arm and an upper control arm pivotally connected at their outer ends to an upright knuckle support. The constructions of these units are basically about the same for all standard car makes, models or years of cars, but do differ in detailed design and somewhat in dimensions and in the amounts of camber and caster angles.

The different parts of a suspension unit assume definite positions relative to the frame structure of the automobile to which they are mounted and definite positions relative to each other when assembled in an automobile, and when subjected approximately to curb weight conditions (i. e. weight of car plus gas tank at least half full). Adjustments in the alignment of a front wheel suspension unit must, therefore, be made while this unit is in position to simulate approximately curb weight conditions, thereby to assure accuracy in these adjustments within tolerable limits. Therefore, it has hitherto been found necessary to make adjustments and repairs of suspension units while said units are mounted in situ in the automobiles. Adjustments and repairs of the suspension units under these mounted conditions are difficult and inconvenient to make and are extremely time consuming.

One of the objects of the present invention is to provide a device or improved apparatus which holds, gauges and locates a front wheel suspension unit of the swivel-jointed type in such a way, that its parts accurately assume with respect to a horizontal plane and with respect to each other, the positions they would assume in an automobile under approximately curb weight conditions, whereby adjustments for camber and caster angles of the wheel axle or steering knuckle king pin may be made within the tolerances permitted by the automobile manufacturer; and which adjustments may be easily and quickly manipulated, arranged and made to permit the interchangeable mounting of front wheel suspension units of different makes, models or years in proper position for adjustment; and whereby this improved apparatus holds, clamps and supports a front wheel suspension device firmly and in accessible position for easy repair, assembly and adjustment.

Another object of the present invention is to provide a method of setting up a detached front wheel suspension unit for adjustment and alignment and in such a way as to simulate the position of said unit when mounted in the automobile under approximately curb weight conditions.

In carrying out certain method features of the present invention, the suspension unit to be repaired or readjusted for proper wheel alignment is detached from the automobile and one part thereof is clamped in fixed position to define a fixed datum or reference point or surface. All other movable parts of the suspension unit are then gauged and located with respect to this datum point and held in located position in accordance with the manufacturer's specification of the suspension unit under curb weight conditions. The proper adjustments for the angles of camber, caster are then made while the suspension unit is so held.

After these operations, any repair and alignment of the suspension unit is effected.

The apparatus for carrying out some of the method steps of the present invention includes in its more specific aspects, a tiltable table top to impart to the entire suspension unit the proper pitch with respect to the horizontal plane, a fixed locating support on said table for the inner end of the lower control arm to establish a fixed datum point or surface for said suspension unit, a locating support for another part of said lower control arm adjustable substantially vertically, to adjust the inclination of said lower control arm with respect to the horizontal, and a locating support for a part of the upper control arm adjustable substantially vertically, to adjust the elevation of said upper control arm with respect to said datum point or surface. The adjustability of the locating supports permits the interchangeable accommodation of suspension units of different makes, models and years. Adapter plates are desirably employed for one or more of the adjustable locating supports, to accommodate interchangeably those parts of the suspension unit which differ in design and/or dimensions because of the difference in the make, model or year of automobile.

With the suspension unit set as described, the necessary repairs and adjustments, such as those for proper camber and caster angles can be readily made. There is assurance that when the suspension unit adjusted as described is mounted in the automobile, no great amount of fitting is required and its adjustments will conform with the specifications prescribed by the manufacturer.

It is possible by means of the process and device of the present invention for a garage mechanic to have on hand a suspension unit for a specific make, model or year of car all conditioned, adjusted and readied for immediate replacement, so that when a repair or adjustment of a suspension unit in a car is required, the mechanic merely replaces the old unit with the unit which has been previously reconditioned and aligned. No further adjustments in camber or caster angles of the replacing suspension unit in situ will be required.

Various other objects, features and advantages of the invention will be apparent from the following description and from the accompanying drawings, in which:

Fig. 4 is a perspective of a suspension unit holding device or apparatus embodying the structural features of the present invention and shown before the suspension unit to be adjusted or repaired is mounted in position thereon;

Figure 1:
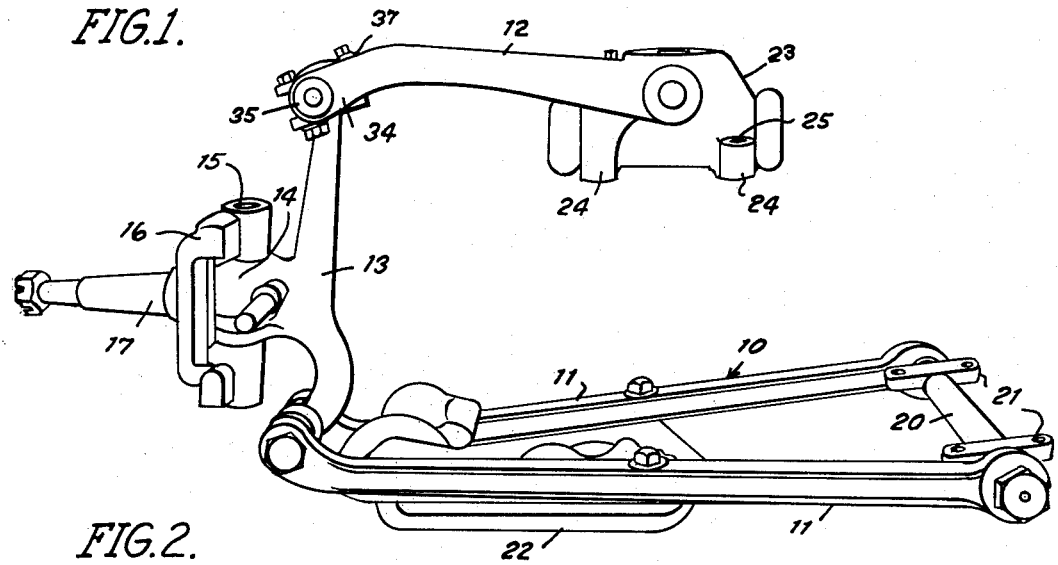
Fig. 1 is a perspective of a front wheel suspension unit of the knee-action type adapted to be supported in the holding device of the present invention for repair, assembly and adjustment.
Figure 2:
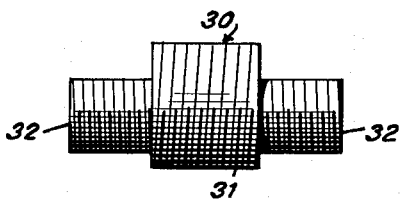
Fig. 2 is a detail side elevation of the eccentric upper pivot pin of the suspension unit by which slight corrections of camber and caster angles may be made.
Figure 3:
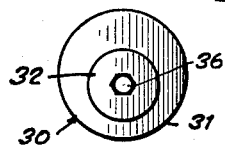
Fig. 3 is an end view of the eccentric upper pivot pin.
Figure 5:
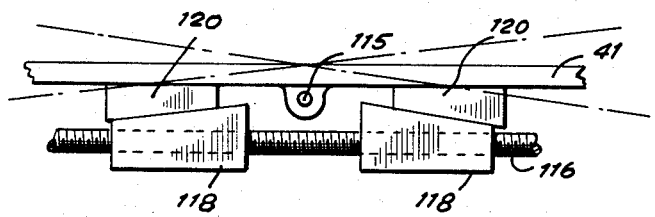
Fig. 5 is a detail of the means by which the table top of the holding device may be tilted.

Referring to Figs. 1, 2 and 3 of the drawings, there is illustrated an example of a standard type of swivel-jointed front wheel suspension unit 10, which can be supported in accordance with the method of the present invention and which may be held in the holding device, embodying the structural features of the present invention. This front wheel suspension unit 10 is shown of the conventional knee-action type and comprises a lower control arm 11, an upper control arm 12, a knuckle support 13 pivotally connected at its ends to the outer ends respectively of said arms, and having a lateral intermediate extension terminating in a sleeve 14 receiving a steering knuckle king pin 15, a steering knuckle 16 embracing the ends of said king pin, and a wheel axle 17 integral with and extending laterally from said steering knuckle.

The lower control arm 11 has a rod 20 at its inner end interconnecting the side pieces of said arm and a pair of mounting brackets 21 at the ends of said rod for connection to the front cross-member brace (not shown) of the vehicle chassis to which the suspension unit is to be attached. The lower control arm 11 also has a seat 22 for the usual coil spring (not shown) operable between the outer end of the front cross-member brace (not shown) of the vehicle chassis and said seat.

The upper control arm 12 is shown of the type which carries at its inner end a shock absorber 23 having mounting brackets 24 with holes 25 for bolt or stud connection to the front cross-member brace (not shown) of the vehicle chassis. The invention may also be applied to suspension units of the swivel-jointed type which are not provided with such shock absorbers.

Front wheel alignment is necessary to keep all interrelated parts affecting steering in proper adjustment and to keep thereby the front wheels in their true running position for easy and efficient steering and prevention of abnormal tire wear. For that purpose, adjustments in camber and caster angles are made. Camber is the outward tilt of the front wheels at the top and results in the bottom of the wheels coming more nearly vertical under the load. Caster is the angle of backward inclination between the steering knuckle king pin and the vertical plane.

Figure 7:
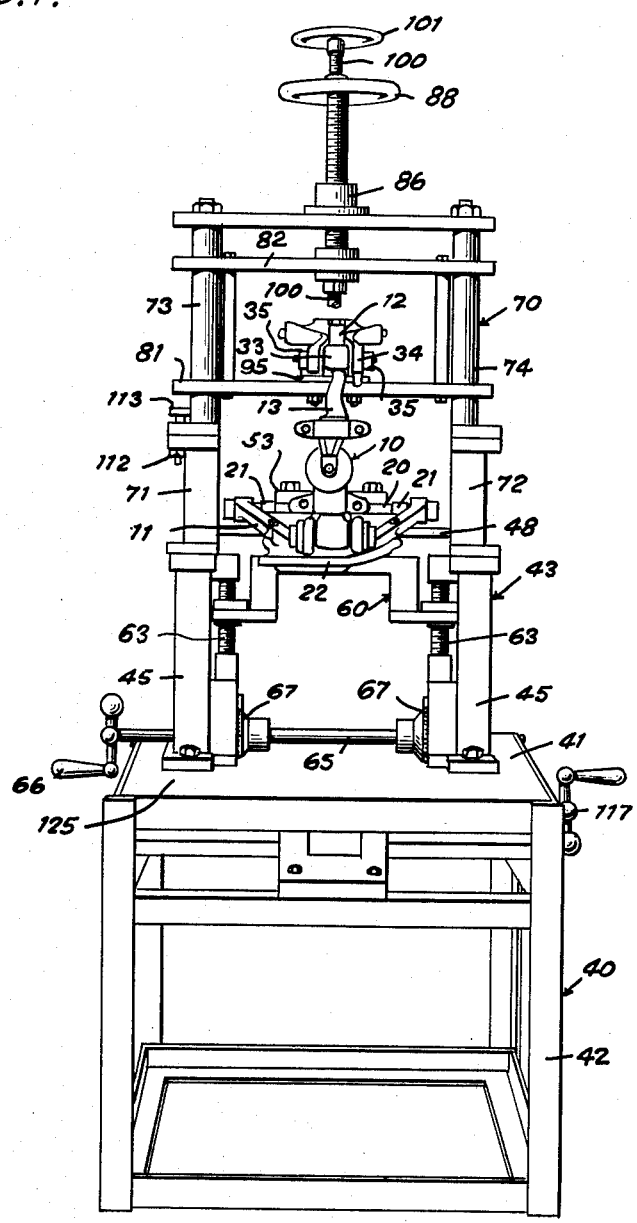
Fig. 7 is an elevation of the holding device shown in Fig. 6.

To obtain slight corrections in camber and caster angles, the conventional suspension unit of the knee-action type is provided between the outer end of the upper control arm 12 and the upper end of the knuckle support 13 with a pivot pin 30, having an intermediate eccentric 31 and coaxial screws 32 projecting from the ends of said eccentric and offset from the center thereof. The upper end of the knuckle support 13 is provided with an internally threaded sleeve 33 (Fig. 7) which receives the eccentric 31, while the outer end of the upper control arm 12 is provided with a yoke or clevis 34 (Figs. 1 and 7), the arms of which have respective bushings 35 threaded therein and threaded on to the screws 32, respectively.

In Fig. 1 the pin 30 is locked in position by the lock bolt 37 shown at the right hand side of the steering knuckle support, which lock bolt is loosened and a grease fitting locked at the forward part of the upper control arm is removed from the end of the bushing 35, thereby permitting an Allen wrench to be inserted in the socket 36 for turning the pin 30 and forcing the top of support 13 to move to the right or left for the adjustment of the caster angle. At the same time the eccentric part of the pin 30 is caused to move to or from the center for a plus or minus change of the camber angle. Normally the amount to be adjusted is checked before the pin is moved by the use of a suitable gauge shown on stub axle 17 (Fig. 6) and the rotation of pin 30 plus or minus will adjust for the camber and caster angles. After the adjustment is made, the grease fitting is returned and the bolt 37 is tightened into position.

In order to make properly the required adjustments for camber and caster, it is necessary for the suspension unit to be in a position which is equivalent to its assembled curb weight position in the motor vehicle. That is why it has been hithertofore recommended that all alignment checks should be made with the weight of the vehicle on the wheels.

In accordance with the method and apparatus of the present invention, the suspension unit is set up apart from the motor vehicle, but in position to simulate the unit's assembled position in the motor vehicle at curb weight. The gauge data which are applied in accordance with the present invention to set up properly the suspension unit without being mounted in a car are: (1) the inclination with respect to a horizontal plane of the unit as a whole in a direction extending from the front to the rear of the unit (i. e. longitudinally of the motor vehicle); (2) the inclination with respect to a horizontal plane of the lower control arm 11 along its length; and (3) the vertical distance between the plane of the top surfaces of the chassis mounting brackets of the lower control arm 11 and the plane of the bottom surfaces of the chassis mounting brackets of the upper control arm 12, this vertical distance being measured in the specific form of the suspension unit shown between the opposed surfaces of the brackets 21 and 24.

In applying this gauge data for the proper setting of the suspension unit, the unit is tilted as a whole to give the proper angle of assembly in the motor vehicle, a part of the unit is clamped in a fixed position to establish said part as a fixed datum or reference point, and the other movable parts of said unit are gauged, located and supported with respect to said datum point into predetermined positions corresponding to those under curb weight conditions. The more specific aspects of the method will be made apparent in connection with the description of the holding, gauging and locating device shown in Figs. 4 to 7.

The holding, gauging and locating device comprises a table 40 having a top 41 and a supporting structure 42 therefor. This top 41 is tiltable for the purpose and in the manner to be described.

Secured to the table top 41 near one end thereof is a lower frame 43 carrying the supports for the lower control arm 11 of the suspension unit 10. This frame 43 is shown comprising two columns 44 at one end and two columns 45 at the other end. The two columns 44 and 45 on each side of the frame are secured to a common base 46 bolted or otherwise affixed to the table top 41 and are secured together at the top by a bar 47.

Secured to and extending across the top of the two columns 44 is a fixed support plate 48 for the inner end of the lower control arm 11 of the suspension unit. Since the design of the inner end of the lower control arm may vary slightly for different makes, models and years of car, there is provided an adapter seat plate 50 which is removably mounted on the support plate 48, as for example, by dogs 51 and which is designed to conformably and firmly seat the cross-rod 20 of the lower control arm 11. This adapter seat plate 50 can easily be replaced by an appropriate seat plate, according to the particular suspension unit to be set up.

A clamp plate 53 preferably hinged at 54 to the support plate 48 is adapted to be locked over the inner end of the lower control arm 11 by a pivot bolt 55, to hold said arm end in fixed position.

For supporting another section of the lower control arm 11 and for varying the inclination of said lower control arm along its length with respect to the horizontal, there is provided a support 60 in the form of a platform, movable substantially vertically and shown in the form of an inverted U-shaped member extending between the frame columns 45, and having a top support plate 61 for the spring seat section 22 of the lower control arm 11. For moving this platform 60 substantially vertically, there is provided a pair of upright lead screws 63 on the inner sides of the frame columns 45, respectively, journalled for rotation but held against axial movement. The platform 60 is provided with feet extensions 64 having threaded engagement with the lead screws 63, respectively, so that as said screws rotate the platform is moved up or down therealong.

For rotating the lead screws 63 in unison, there is provided a shaft 65 near the base of the frame 43, terminating in an easily accessible handle 66 near one side of the table 40 and carrying miter gears 67 meshing with miter gears 68 at the lower ends of said lead screws.

Mounted on the lower frame 43 is an upper frame 70 carrying the movable support for the upper control arm 12. For mounting this upper frame 70 to the lower frame 43, said lower frame comprises a pair of short stands 71 and 72 bolted or otherwise affixed to the frame bars 47, respectively.

The upper frame 70 comprises a pair of parallel upright side pieces in the form of pillars 73 and 74 mounted on the stands 71 and 72, respectively, of the lower frame 43 in a manner to be described, and rigidly secured together at the top by a cross frame plate 76. Supported from this frame plate 76 and adjustable substantially vertically along the upper frame 70 is a support 81 in the form of a platform constituting part of an elevator structure having a plate 82 spaced above said platform and rigidly connected thereto by side pieces 83. The ends of the platform 81 and the plate 82 have holes to embrace the pillars 73 and 74 with a snug fit, so that these pillars serve as guide rails in the movement of the elevator structure up and down.

For supporting the platform 81 and effecting its up and down movement, the upper frame plate 76 has secured thereto, a nut sleeve 86 into which is threaded an upright screw 87 carrying a turning handle 88 at its upper end. The lower end of the screw 87 is journalled in a thrust bearing 90 secured to the plate 82 of the elevator structure and is retained therein against axial movement relative thereto.

The platform 81 is adapted to support the inner end of the upper control arm 12. In connection with the specific form of the suspension unit 10 shown, the platform 81 is adapted to support the shock absorber 23 at the inner end of the upper control arm 12. Since the inner end of this upper control arm 12 may, in certain makes, models or years of suspension unit, not have such a shock absorber or may have one that differs, it is desirable to provide an adapter seat plate 95 removably secured to the platform 81, as for example, by bolts 96 and having conformations or projections to conformably engage the particular type of suspension unit to be supported. In the specific form shown, the adapter seat plate 95 has a plurality of upwardly projecting pins or studs 97 properly spaced to extend into corresponding holes 25 of the mounting brackets 24 of the shock absorber 23 and to retain thereby said shock absorber firmly against horizontal displacement with respect to the seat plate 95.

For clamping the inner end of shock absorber 23 or its base of the upper control arm 12 firmly on to the seat plate 95, the adjusting screw 87 is of hollow construction and has threaded therein an internal screw 100 carrying at its upper end above the screw 87, a turning handle 101 and carrying at its lower end with a swivel connection 102, a clamping plate 103 adapted to press and hold the inner end of the upper control arm 12 against the seat plate 95.

On units which do not have the shock absorber 23 on the ends of the upper control arm there is a shaft which is firmly fastened or positioned on to plate 95, and the readings or adjustments obtained.

The upper frame 70 is desirably adapted to swing with respect to the lower frame 43 from the operative position shown in the drawings, to permit easier placement of the suspension unit in the device, although this swingable arrangement of the upper frame is not necessary. To provide for such swinging movement, the stand 71 has a plate 110 affixed to its top, and the rail or pillar 73 has rigidly secured to its lower end a plate 111 carrying a fastening bolt 112 and a locking nut 113, by which said plate 111 can be detachably secured and locked to the stand plate 110. When it is desired to move the upper frame 70 into inoperative position, the locking stud 113 and the fastening bolt 112 are loosened and the upper frame 70 swung about the fixed pillar or rail 74. This pillar 74 is of cylindrical shape to permit this swinging movement of the upper frame 70 about said pillar.

The table top 41 is tiltable in order to tilt the entire frame structure with the different supports thereon as a unit rearwardly of the suspension unit. To that end, the table top 41 is pivoted at 115 (Fig. 5) to the table supporting structure 42. Journalled in suitable bearings (not shown) on the table supporting structure 42 for rotation without axial translation, is a lead screw 116 (Figs. 4 to 7) terminating at one end beyond the side of the table 40 in an easily accessible turning handle 117. Threaded on to this lead screw 116 are two wedge-shaped cams 118 (Fig. 5) having oppositely inclined cam surfaces in slide engagement with two correspondingly wedge-shaped cam followers 120 affixed to the underside of the table top 41. By turning the handle 117 in the proper direction, the table top 41 may be inclined to give the proper pitch to the supported suspension unit 10 with respect to a horizontal plane, to correspond to the pitch of said unit when assembled in the automobile and when subjected to curb weight conditions.

If the holding device has an upper swingable frame, and it is desired to swing this frame open for the more facile placement of the suspension unit therein, then the bolt 112 and stud 113 (Figs. 5 to 7) are loosened and the upper frame 70 is swung outwardly from the operative position shown about the pillar or rail 74, as already described. With the holding device so opened up, the proper adapter seat plate 50 is secured to the support plate 48, the inner end of the lower control arm 11 (in this case the rod 20) is placed in fixed position on said seat plate with the mounting brackets 21 exposed and the spring seat portion 22 of said lower control arm is placed on the support plate 61. The hinge plate 53 is then clamped down over the inner end of the lower control arm 11 and the upper frame 70 swung back into the operative position shown and firmly secured in place through the fastening elements 112 and 113.

The proper adapter seat plate 95 to suit the particular type of suspension unit to be supported is secured to the platform 81, and the inner end of the upper control arm 12 (in this case the shock absorber 23) is seated on this plate with its locating pins 97 extending into the mounting holes 25 of said inner end. The clamping plate 103 can then be lowered upon the inner end of the upper control arm 12 by manipulation of the internal screw 100, to hold said inner end on to the platform 81. If such a clamping plate 103 is not provided, suitable means may be provided to clamp or bolt the inner end of the upper control arm 12 in position with respect to the adapter seat plate 95.

With the suspension unit mounted in the holding device, as described, there may be made the proper adjusting movements of the different unit supports on said device for the proper gauging and locating of the parts of the unit with respect to each other, and the proper positioning of said unit with respect to a horizontal plate to confirm the position of said unit with its position when assembled in the motor vehicle under curb weight conditions.

To set up the suspension unit in proper position, the following adjustments in the holding device are made:

(1) The table top 41 may be tilted in a direction to tilt the suspension unit in a direction extending generally rearwardly (i. e., lengthwise of the automobile in assembled position of said unit). This tilting operation is effected through manipulation of the turning handle 117, as described, and to a sufficient extent to impart to the unit as a whole a pitch or angle with respect to a horizontal plane corresponding to its pitch when assembled in the motor vehicle under curb weight conditions. The data on the extent of tilt is given by the manufacturer for the particular model and year and the extent of the tilt, which is usually no more than 4°, and can be measured by a suitable spirit level. In many structures of the units there are often no angles of tilting to be adjusted to.

(2) The support 60 for the spring seat section 23 of the lower control arm 11 is then moved substantially vertically through manipulation of the handle 66, to give a proper degree of pitch or angle to said arm with respect to the horizontal, corresponding to the pitch in assembled position in the automobile under curb conditions. The lower control arm 11 may be so set for that purpose, at a plus or minus angle with respect to the horizontal usually amounting to 2° more or less.

With the tilt of the suspension unit as a whole from front to back, and the tilt of the lower control arm 11 in the direction of its length properly set, the inner end of said lower control arm will be fixed and established as the reference or datum point for the adjustment in the location of the upper control arm 12. More specifically, the upper surfaces of the mounting brackets 21 are established as the datum plane from which the location of the upper control arm 12 is gauged.

(3) The platform 81 is moved substantially vertically through the operation of the handle 88, until the inner end of the upper control arm 12 is at a prescribed vertical distance from the fixed inner end of the lower control arm 11. More specifically, this vertical distance is gauged between the planes of the opposed surfaces of the mounting brackets 21 and 24 and will correspond to the distances between these surfaces, when the unit is assembled in the motor vehicle and is under curb weight conditions.

Figure 6:
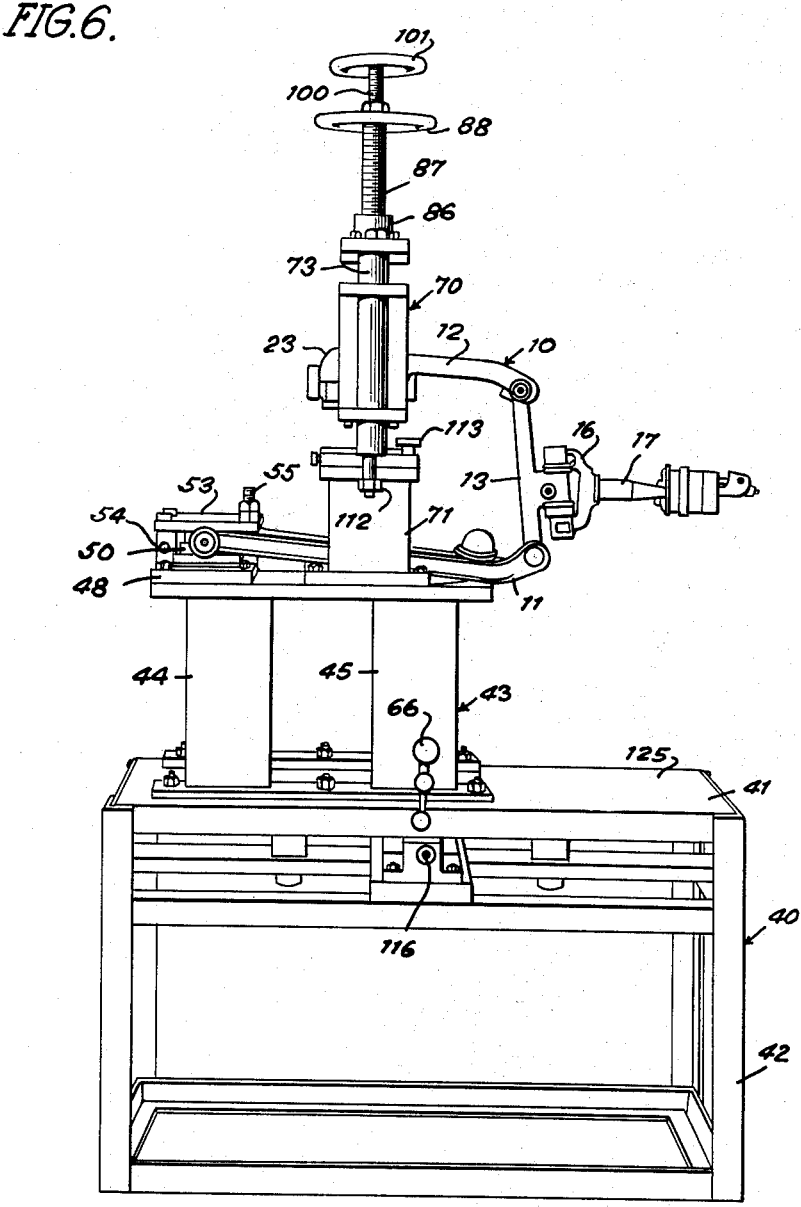
Fig. 6 is a side elevation of the holding device, but shown with the suspension unit properly mounted thereon for adjustments.

It should be noted that the suspension unit when properly supported, as described, will have a substantial portion of its outer section projecting laterally outwardly beyond the general columnar outline of the structures 43 and 70, as shown in Fig. 6, so that this unit section is easily accessible for whatever operation is required to be performed thereon. The parts of the suspension unit so projected are the outer portions of the control arms 11 and 12, the knuckle support 13, the knuckle connections 14, 15 and 16 and the wheel axle 17. A suitable indicating gauge is shown temporarily mounted on this axle 17.

It should also be noted that the frame structures 43 and 70 are mounted at one end of the table 40, leaving a substantial section 125 of the table top 41 directly below the projecting parts of the suspension unit available as a work and tool bench, when operating on said projecting parts.

After the suspension unit has been set in the holding device, as described, it is ready for checking for camber and caster aligning adjustments. For that purpose, the usual gauge is employed having a spirit level. This gauge is applied to the wheel axle 17 in such a way that the bubble is level and is in line with the center line of the wheel axle. When the gauge has been adjusted to bring this bubble into a zero position, then the gauge is set to show on its calibrations the allowable positive or negative camber angles. If the angle indicated in the gauge is greater or less than required by the manufacturer, then the upper control arm eccentric pin 30 is turned and thereby adjusted to throw the upper end of the knuckle support 13 outwardly or inwardly with respect to its lower mount. The eccentric pin 30 has a 1° throw, ½° on each side of its neutral or zero position, permitting an adjustment for camber of up to ½° on each side. The necessity for greater corrections of camber angle indicates that the parts are bent to an extent requiring repair or replacement. If repair can be effected, a bending bar may be applied to the knuckle support 13 and hydraulic pressure applied to said bar to obtain the approximate camber angle required. Finer adjustments in camber angle are then obtained through manipulation of the eccentric pin 30, as described.

For checking and aligning to obtain proper caster angle, the gauge is placed on the end of the steering knuckle 16 or the wheel axle 17 (Fig. 6) in straight ahead position of the steering knuckle. The steering knuckle 16 or axle 17 is then moved rearwardly 20° from this straight ahead position, and the gauge is adjusted to its zero position on its calibrations, and the spirit level of the gauge is adjusted to its normal level position. The apparatus is now in its starting position for calibration for caster angle. The steering knuckle 16 is then returned 20° to its straight ahead position and 20° further in the opposite direction, making a total of 40°. The gauge is again adjusted to level the bubble in the spirit level. The calibrations on the gauge will then indicate the caster reading as being either positive or negative from the straight line position.

If the caster reading is more or less than that called for by the specifications of the manufacturer, then the eccentric pin 30 is turned in appropriate directions, to cause the upper end of the steering knuckle support 13 to move forwardly or rearwardly with respect to its lower mount, and to impart thereby to the king pin 15 the proper caster angle with respect to the vertical. In making the adjustment for the caster angle so as to tip the kingpin in either a desired plus or minus direction, it is desired that the pin 30 shall be turned 360° in order to move the screw portions 32 to accomplish the caster angle desired change, and in such a 360° movement the eccentric portion of the pin 30 is repositioned so that the camber angle is maintained, and is so kept or the pin 30 revolved another 360° for the purpose of properly obtaining and completing the caster angle adjustment. The movement of the pin 30 in its bushings causes the knuckle support 13 to move toward or away from, or perpendicularly, to the longer axis of the upper control arm 12. Preferably it is desired to adjust for the caster angle first. After the caster angle is adjusted, then the camber angle is adjusted by oscillating the pin 30 a small amount so as to have the eccentric operate to move the top of the knuckle 13 outwardly or inwardly and in a direction that is in line with the longer axis of the upper control arm 12. Such outward or inward movement of the top of the kingpin is in contrast to the perpendicular movement to the longer axis of arm 12 for adjusting the caster angle. The pin 30 is preferably rotated or oscillated by employing a wrench of the Allen type which is placed in the opening 36 in the end of the pin.

The automobile manufacturers recommend making the caster angle adjustment first, and then to adjust the camber angle. Thus, the movement of pin 30 in its bushings carried by yoke 34 gives the caster angle adjustment, and then the camber angle adjustment, by means of the eccentric, is made.

It should be noted that the holding device is rugged and strong enough not only to support the supension unit for aligning adjustments, but also to hold rigidly the parts of said unit, so that substantial repair force and power can be safely applied thereto. Such operations as bending, replacing and repairing of different parts of the suspension unit preliminary to aligning can, therefore, be safely carried out, while the unit is secured in the holding device.

After the suspension unit has been aligned, as described, it can be taken out of the holding device or apparatus and assembled in the motor vehicle, with full assurance that the unit will fit properly and will have the desired alignment for proper and stabilized steering and minimum tire wear.

While the invention has been described with particular reference to a specific apparatus or embodiment, it is to be understood that it is not to be limited thereto, but is to be construed broadly and restricted solely by the scope of the appended claims.

The invention claimed is:

1. A device for holding for aligning adjustments of a front wheel suspension unit of the knee-action type, comprising a table having a top and a supporting structure therefor, said top being tiltable with respect to said structure, an upright frame secured to said table top for tiltable movement therewith and for receiving and holding said front wheel suspension unit, and supporting means on said frame for holding the parts of said unit in positions with respect to each other corresponding to the relative positions they will assume when mounted in a motor vehicle, the said table top serving to level or tilt rearwardly said table top and said frame as a whole with respect to a horizontal plane and at an angle to correspond to the angle of said unit when mounted in the motor vehicle, said table top and said frame and said supports holding said suspension unit firmly in position while making adjustments of its engaging and movable parts for caster and camber angles thereof.

2. A device for holding a front wheel suspension unit of the knee-action type without a spring therein and having a lower control arm, an upper control arm and a knuckle support pivotally connected to and between said control arms, while said unit is detached from the motor vehicle in which it is to be mounted, comprising a frame, adjusting means for supporting the lower control arm in position and at a rearward inclination with respect to the horizontal corresponding to its inclination under curb weight conditions, said support platform in the upper part of a frame, an adaptor seat plate removably mounted on said platform for receiving and holding the free end of said upper control arm, said platform and said seat plate being adjustable substantially vertically to position the free end of said upper control arm in curb weight alignment with said lower control arm without spring spreading means mounted between said arms for holding said control arms apart.

3. A device for holding a front wheel suspension unit of the knee-action type without a spring therein and having a lower control arm, an upper control arm and a knuckle support pivotally connected to and between said control arms while said unit is detached from its motor vehicle, comprising a frame, supporting means for receiving and pivotally clamping the inner end of the lower control arm in fixed position, an adjustable support for a section of said lower control arm spaced from said inner arm end, said support being movable substantially vertically to adjust the inclination of said lower control arm along its longer axis into angular position corresponding to that under curb weight conditions, and a second support for the free end of said upper control arm movable substantially vertically to gauge the distance between said upper control arm and the clamped inner end of said lower control arm.

4. A device for holding a front wheel suspension unit of the knee-action type without a spring therein and having a lower control arm, an upper control arm and a knuckle support pivotally connected to and between said control arms, comprising a frame, a supporting means therein for clamping the inner end of the lower control arm in fixed position, a pair of parallel upright lead screws journalled in said frame for rotation while maintained against axial movement, a support platform in said frame for a section of said lower control arm spaced from said inner arm end, said platform having at its ends threaded engagements with said lead screws respectively, whereby said platform is moved up and down upon rotation of said lead screws, a handle, a transmission between said handle and said lead screws for rotating said lead screws in unison upon operation of said handle, and a second support platform in said frame for the upper control arm movable substantially vertically to gauge the distance between said upper control arm and the clamped inner end of said lower control arm to correspond to the distance between said arms under curb weight conditions.

5. A device for holding a front wheel suspension unit of the knee-action type without a spring therein and having a lower control arm, an upper control arm and a knuckle support pivotally connected between said control arms, comprising a frame for receiving and clamping the inner end of the lower arm in a fixed position, a support in said frame for a section of said lower control arm and being spaced from said inner arm end and movable substantially vertically to adjust the inclination of said lower control arm into angular position corresponding to that under curb weight conditions, substantially vertical guides, a support platform for one end of the upper control arm associated with and movable along said guides to gauge the distance between the said end of said upper control arm and the clamped end of said lower control arm, and screw means manipulatable to move said support platform along said guides.

6. A device as described in claim 5, said guides comprising a pair of substantially vertical rails, said device including an elevator for said platform engaging said rails for slide movement therealong, a substantially vertical lead screw supported for rotation, and means responsive to the rotation of said screw for moving said elevator up or down along said rails.

7. A device as described in claim 5, said screw means comprising a hollow substantially vertical lead screw, supported for rotation, means responsive to the rotation of said screw for moving said platform up or down along said guides, a second lead screw threaded into and along said first lead screw, whereby said second lead screw may be moved axially along said first screw by turning therein, and a clamping plate at the lower end of said second lead screw for clamping said upper control arm on to said platform.

8. A device for holding a front wheel suspension unit of the knee-action type without a spring therein and having a lower control arm, an upper control arm and a knuckle support pivotally connected to and between said control arms, comprising a lower frame, means on said frame for holding and supporting the lower control arm in position corresponding to the position assumed under curb weight conditions, an upper frame supported on said lower frame and swingable about one side thereof out of operative position and into position to render said lower holding and supporting means accessible for the placing of the lower control arm thereon, and a support for the upper control arm carried by said upper frame and movable substantially vertically therealong to gauge the distance between said upper control arm and the inner end of said lower control arm.

9. A device for holding a front wheel suspension unit of the knee-action type without a spring therein and having a lower control arm, an upper control arm and a knuckle support pivotally connected to and between said control arms, comprising a lower frame, means on said frame for holding and oscillatingly supporting the lower control arm in position corresponding to the position assumed under curb weight conditions, an upper frame supported on said lower frame and including a pair of substantially vertical guide rails, one of said rails being fixedly secured to and upstanding from one side of said lower frame, said upper frame, aside from said latter rail, being horizontally movable about said latter rail from operative position to render said lower holding and supporting means accessible for the placing of the lower control arm thereon, and a support for the upper control arm carried by said upper frame and movable substantially vertically along said guide rails, to gauge the distance between said control arms.

10. An apparatus for adjusting the camber and caster angles of an automobile knee-action unit without said unit being installed on an automobile, comprising a frame, an adjustable bed carried on said frame, an adjustable plate carried in said apparatus for receiving a part of a lower control arm of said unit in a predetermined position, a binding means for holding said arm against movement in a predetermined position, a second plate for receiving and holding the upper control arm of said unit in a predetermined position at a definite height above the predetermined holding point of said lower control arm, adjusting means for assembling and maintaining said upper control arm in predetermined position on said second plate, a second adjusting member for adjusting the upper control arm and its adjusting means to the determined distance above said lower control arm and for maintaining said control arms and the steering knuckle between said control arms as so assembled while said unit is adjusted for camber and caster angles, said adjustments to be made within the permissible tolerances of said knee-action unit when under curb weight condition of the automobile.

11. A device for holding a front wheel suspension unit of the knee-action type without a spring therein and having a lower control arm, an upper control arm and a knuckle support pivotally connected to and between said control arms while said unit is detached from the motor vehicle in which it is to be mounted, comprising a frame, supporting means in said frame for clamping the inner end of the lower control arm in fixed position, a support mounted in said frame and comprising a part of said clamping means, a removable adaptor seat plate positioned on said support and also forming part of said clamping means, said adaptor seat plate positioned to receive one end of said control arm in a predetermined affixed seated position thereon to act as a datum point, and adjustable support means for securing other parts of said unit in positions with respect to the affixed end of said lower control arm end to correspond to their positions under curb weight conditions.

12. A device for supporting and adjusting an assembly of parts of a front wheel suspension unit of the swivel jointed type to make alignment adjustments of said unit while it is detached from the motor vehicle in which it is to be mounted, said suspension unit composed of a lower control arm and an upper control arm and a knuckle support pivotally connected to and between said control arms, said supporting and adjusting device comprising a frame for receiving said assembled suspension unit, a clamping means for receiving and holding the inner end of said lower control arm in a datum point position, an adjustable support in said frame for holding another part of said lower control arm at a point slightly lower than said datum point to position said lower control arm on a slight downward slant from said datum point and along the longer axis of said lower control arm, a second support in said frame for receiving and holding the inner end of said upper control arm, separate adjusting means for moving said second support and the inner end of said upper control arm to a predetermined position in relation to said datum point, said separate adjusting means being operable after said lower control arm has been fastened into its predetermined position, and adjusting means in said frame for tipping said unit as so held so that the shorter axis of said lower control arm will be moved out of a horizontal plane thereby positioning said suspension unit so that the parts thereof would take their relative positions as when installed in the model of the automobile they were designed for, said unit as so positioned allowing for making adjustments within tolerances of its engaging and movable parts for the caster and camber angles thereof.

13. A device for holding and for aligning adjustments of a front wheel suspension unit of the knee-action type without a spring while said unit is detached from the motor vehicle in which it is to be mounted, comprising a frame having a plurality of separately adjustable supports for different parts of said unit, at least two of said supports being adjustably movable with respect to each other and at different times to hold parts of said unit in predetermined positions with respect to each other and to a horizontal plane corresponding to the positions they will assume when mounted in the motor vehicle and to so hold said unit while adjustments of the caster and camber angles are made, and means for tilting the unit as supported in said supports into predetermined angular position with respect to a horizontal plane to correspond to the angular position of said unit as a whole with respect to the chassis of the motor vehicle into which said unit is to be mounted.

References Cited in the file of this patent

UNITED STATES PATENTS

| | | |
|---|---|---|
| 1,428,509 | Weingar | Sept. 5, 1922 |
| 1,700,748 | Schaaf | Feb. 5, 1929 |
| 1,884,689 | Hilpert | Oct. 25, 1932 |
| 1,891,127 | Wallis | Dec. 13, 1932 |
| 1,972,285 | Bennett | Sept. 4, 1934 |
| 2,030,594 | Hyde et al. | Feb. 11, 1936 |
| 2,311,536 | Goodman | Feb. 16, 1943 |
| 2,532,749 | Aurand et al. | Dec. 5, 1950 |

FOREIGN PATENTS

| | | |
|---|---|---|
| 514,800 | France | Nov. 18, 1920 |